United States Patent [19]

Nakayama et al.

[11] Patent Number: 5,654,779
[45] Date of Patent: Aug. 5, 1997

[54] LIQUID CRYSTAL DISPLAY DEVICE HAVING A REMOVABLE HOLDING MEMBER FOR THE LIGHT SOURCE

[75] Inventors: Tatsuya Nakayama; Takanori Takaki; Seiki Takahashi; Toshio Tobita, all of Kumamoto, Japan

[73] Assignees: Mitsubishi Denki Kabushiki Kaisha; Asahi Glass Company Ltd., both of Tokyo, Japan

[21] Appl. No.: 365,791

[22] Filed: Dec. 29, 1994

[30] Foreign Application Priority Data

May 18, 1994 [JP] Japan .................. 6-103797

[51] Int. Cl.$^6$ .................. G02F 1/1333; G02F 1/1335; G01D 11/28; F21V 7/04
[52] U.S. Cl. .................. 349/58; 349/64; 349/65; 345/905; 362/26; 362/27; 362/31; 385/901
[58] Field of Search .................. 362/26, 27, 31, 362/32; 359/40, 41, 42, 48, 50, 49, 69, 70, 83; 385/146, 901; 345/905; 349/58, 61, 62, 64, 65, 70, 113

[56] References Cited

U.S. PATENT DOCUMENTS

| 4,043,636 | 8/1977 | Eberhardt et al. | 359/42 |
| 4,560,264 | 12/1985 | Kitazawa et al. | 359/83 |
| 4,573,766 | 3/1986 | Bournay, Jr. et al. | 359/48 |
| 4,945,350 | 7/1990 | Kawamura | 359/50 |
| 5,121,232 | 6/1992 | Miyadera | 359/49 |
| 5,128,781 | 7/1992 | Ohno et al. | 362/26 |
| 5,166,815 | 11/1992 | Elderfield | 359/49 |
| 5,182,660 | 1/1993 | Tanaka | 359/50 |
| 5,438,484 | 8/1995 | Kanda et al. | 385/95 |
| 5,453,855 | 9/1995 | Nakamura et al. | 359/83 |
| 5,473,454 | 12/1995 | Blanchard | 359/69 |
| 5,542,016 | 7/1996 | Kaschke | 385/901 |
| 5,555,160 | 9/1996 | Tawara et al. | 362/31 |

FOREIGN PATENT DOCUMENTS

| 3208-162 | 10/1982 | Germany | 362/31 |
| 62-35390 | 3/1987 | Japan . | |
| 63-150985 | 10/1988 | Japan . | |
| 4-102888 | 4/1992 | Japan . | |
| 4-186226 | 7/1992 | Japan | 359/48 |

*Primary Examiner*—William L. Sikes
*Assistant Examiner*—Walter J. Malinowski
*Attorney, Agent, or Firm*—Leydig, Voit & Mayer

[57] ABSTRACT

A liquid crystal display device adaptable for various applications is provided which comprises a liquid crystal display panel, lamps, lamp holders respectively holding the lamps, a photoconductive board provided between the lamps, and a frame covering both the lamps and the lamp holders, wherein the photoconductive board comprises an outer photoconductive part fixed to the lamp holders, and an inner photoconductive part held on the rear side thereof by a holding member provided to the frame.

11 Claims, 9 Drawing Sheets

LIQUID CRYSTAL DISPLAY DEVICE HAVING A REMOVABLE HOLDING MEMBER FOR THE LIGHT SOURCE

BACKGROUND OF THE INVENTION

The present invention relates to thin liquid crystal display devices.

Typically, a liquid crystal display device 5 includes a liquid crystal display panel in which an opposing pair of substrates sandwiches a display material such as a liquid crystal, a circuit board for driving the display panel, an edge lighting unit disposed behind the display panel, and a frame covering these components. The edge lighting unit includes a light guiding board, a lamp disposed on each lateral side of the board, and a holder for holding each lamp. Conventional liquid crystal display devices are shown in FIGS. 10 and 11 and include frames 1a and 1b, a liquid crystal display panel 2, circuit boards 3a and 3b, a light guiding board 4, lamps 5a and 5b, lamp holders 10a and 10b, and a lamp housing 11.

Figure 10:
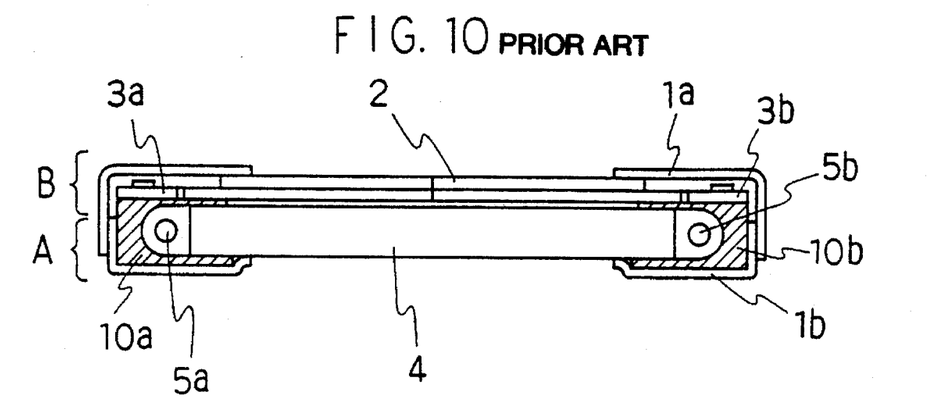
FIG. 10 is a sectional view showing the structure of a conventional liquid crystal display device.
Figure 11:
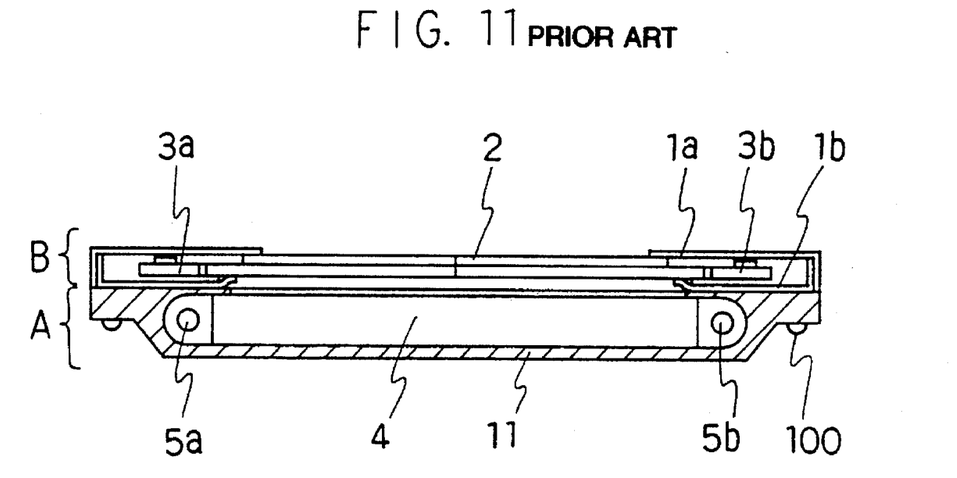
FIG. 11 is a sectional view showing the structure of another conventional liquid crystal display device.

As shown in FIG. 10, one conventional liquid crystal display device includes a light guiding board 4 comprising one board on respective lateral sides of which are disposed the lamps 5a and 5b and lamp holders 10a and 10b for holding the corresponding lamps 5a and 5b, and outer frames 1a and 1b that sandwich and cover these components, together with a liquid crystal display panel 2 and circuit boards 3a and 3b. Alternatively, as shown in FIG. 11, another conventional liquid crystal display device includes separably assembled, using a fastening member 100 such as a screw, a lighting unit A including a lamp housing 11 for holding a light guiding board 4 and lamps 5a and 5b and a liquid crystal display panel section B including a liquid crystal display panel 2, circuit boards 3a and 3b, and outer frames 1a and 1b that sandwich and hold the panel 2 and circuit boards 3a and 3b.

When a liquid crystal display device is used in individual display devices, such as an OHP (Over Head Projector) and personal computer, the lighting means needs to be replaced with a suitable one. However, in conventional liquid crystal display devices employing the described structures, the frames 1a and 1b must be first removed to separate the lighting unit section A or the light guiding board 4 from the liquid crystal display panel section B. This process entails cumbersome operations in disassembly and assembly.

In the conventional liquid crystal display device shown in FIG. 10, the monolithic light guiding board 4 together with the liquid crystal display panel 2 and the like are covered by the frames 1a and 1b. Accordingly, to remove or mount only the lamps or light guiding board 4, they must be detached from the lamp holders 10a and 10b after removal of the frames 1a and 1b. This process not only is cumbersome but also degrades the reliability of the device since the circuit boards 3a and 3b are exposed in the conventional liquid crystal display device shown in FIG. 11, on the other hand, the lighting unit and the liquid crystal display panel section are readily separable and the problem associated with the other conventional device does not arise. Nevertheless, these sections each have an element for fastening them together, enlarging the dimensions of their outer forms.

Further, with the foregoing edge light type lighting unit, light from the lamps on opposite sides of the light guiding board 4 propagate toward the center of the light guiding board 4. Only light that is deflected upwardly, as viewed in the drawing, by reflection or diffusion means (not shown) on the upper or lower side of the light guiding board 4 is utilized to illuminate the liquid crystal display panel 2, resulting in insufficient utilization of light.

Still further, since the light guiding board 4 is relatively heavy, it is difficult to position the board 4 precisely during its mounting, and significant labor is needed for handling the board 4.

SUMMARY OF THE INVENTION

The present invention has been made to overcome the foregoing problems of the prior art.

It is an object of the present invention to provide a liquid crystal display device wherein at least a part of the light guiding board can be removed from the lighting unit section or lighting means can be removed from the liquid crystal display panel section without removing the frames and without the need of varying the outer dimensions and thickness of the device.

It is another object of the present invention to provide a liquid crystal display device that utilizes light with higher efficiency.

It is a yet object of the present invention to provide a liquid crystal display device having lighter weight removable portions.

According to a first aspect of the present invention, there is provided a liquid crystal display device comprising a liquid crystal display panel, lamps, lamp holders respectively holding the lamps, a light guiding board provided between the lamps, and a frame covering both the lamps and the lamp holders wherein the light guiding board comprises an outer light guiding part fixed to the lamp holders, and an inner light guiding part held on the rear side by a holding member mounted on the frame.

According to a second aspect of the present invention, there is provided a liquid crystal display device comprising a liquid crystal display panel, lamps, lamp holders respectively holding the lamps, a light guiding board provided between the lamps, and a frame covering both the lamps and the lamp holders wherein the light guiding board comprises an outer light guiding part fixed to the lamp holders and an inner light guiding part held on the rear side by a holding member mounted on the frame, and the inner light guiding part has on the front side a surface inclined from the opposite side edges toward the center.

According to a third aspect of the present invention, there is provided a liquid crystal display device comprising a liquid crystal display panel, lamps, lamp holders, a light guiding board, and a frame holding both the lamps and the lamp holders wherein the frame comprises a frontal frame part covering the front side of the lamps and lamp holders and a rear frame part supporting the rear side of the light guiding board as well as the lamps and lamp holders by means of a holding member, and the rear frame part is disposed outside the opposite side edges of the light guiding board that adjoin the respective lamps while an edge of the rear frame part closest to each of the opposite side edges of the light guiding board is outwardly spaced from the light guiding board.

According to a fourth aspect of the present invention, there is provided a liquid crystal display device comprising a liquid crystal display panel, a frame holding the panel, and a light guiding board containing a lamp, wherein the light guiding board is held on the rear side by means of a holding member mounted on the frame.

With the liquid crystal display device according to the first aspect of the present invention, the inner light guiding part is held in the frame only by the holding member. Therefore, the removal of the holding member allows the inner light guiding part to be removed rearwardly easily.

With the liquid crystal display device according to the second aspect of the present invention, the inner light guiding part is held in the frame only by the holding member. Therefore, the removal of the holding member allows the inner light guiding part to be removed rearwardly easily. Further, since a vacancy is provided in the inner light guiding part, the inner light guiding part is light weight. In addition, light reflected by the inclined portion of the inner light guiding part is additionally utilized, resulting in increased light utilization efficiency.

With the liquid crystal display device according to the third aspect of the present invention, the whole light guiding board can be removed, thereby ensuring easy removal or attachment of the light guiding board, simplifying the structure of the device.

With the liquid crystal display device according to the fourth aspect of the present invention, the light guiding board containing the lamp is removable, thereby facilitating removal or attachment of the lighting unit while utilizing light efficiently.

BRIEF DESCRIPTION OF THE DRAWINGS

In all figures, like elements are given the same reference numbers.

DETAILED DESCRIPTION OF PREFERRED EMBODIMENTS

Embodiment 1

Figure 1A:
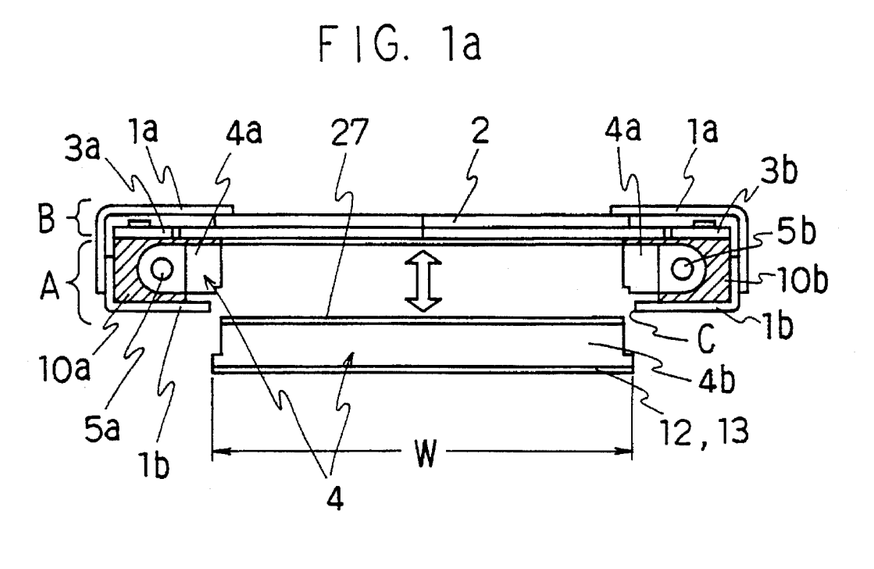
FIGS. 1(a) and 1(b) are sectional views showing the structure of one embodiment of a liquid crystal display device according to the first aspect of the present invention.
Figure 1B:
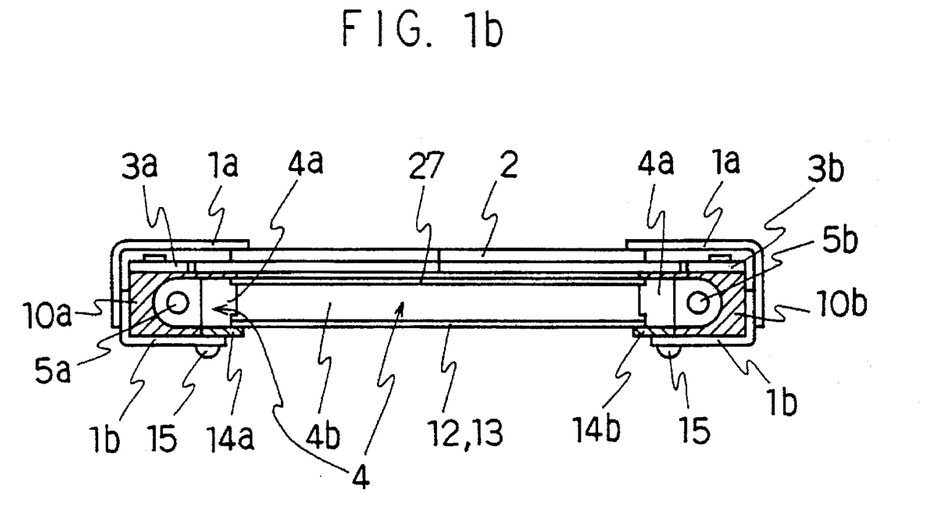

FIGS. 1(a) and 1(b) illustrate in section an embodiment of a liquid crystal display device according to the first aspect of the present invention and wherein numerals common to FIG. 10 denote like or corresponding parts for which descriptions are omitted.

The liquid crystal display device shown includes a light guiding board 4 disposed between lamps 5a and 5b and comprising an outer light guiding part 4a serving as a frame portion and an inner light guiding part 4b. The inner light guiding part 4b is fitted into the outer light guiding part 4a attached to lamp holders 10a and 10b by means of a screw or an adhesive. The light guiding board 4 is a transparent material such as an acrylic resin board.

Figure 2A:
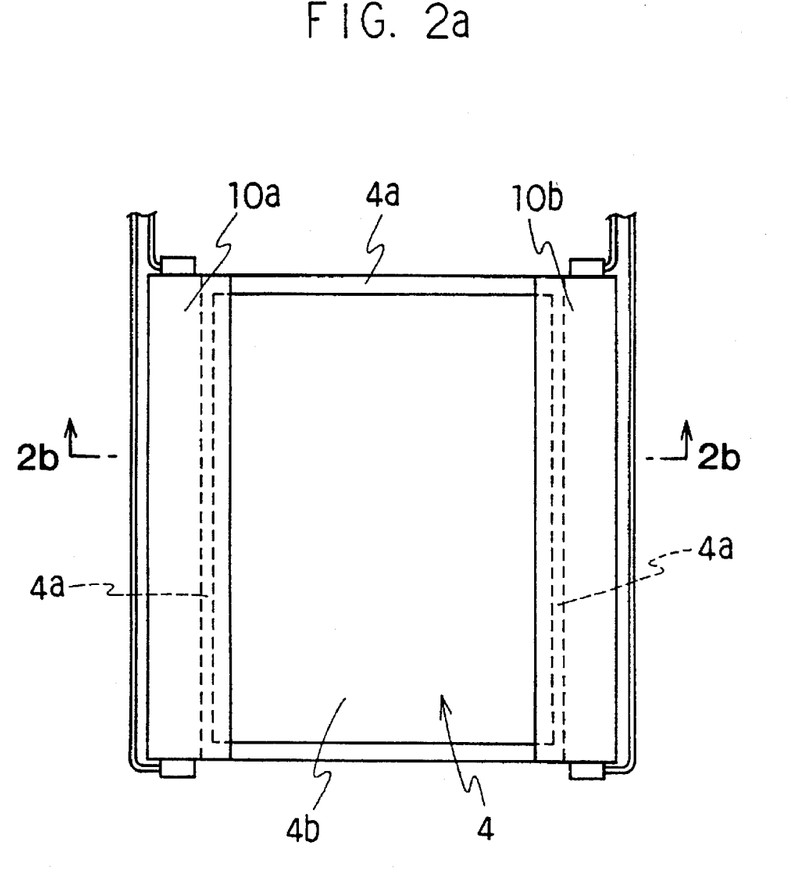
FIGS. 2(a) and 2(b) are a plan view showing the structure of the lighting unit section of the device shown in FIG. 1(a) and a perspective view of the lighting unit section taken along line 2b—2b of FIG. 2(a), respectively.
Figure 2B:
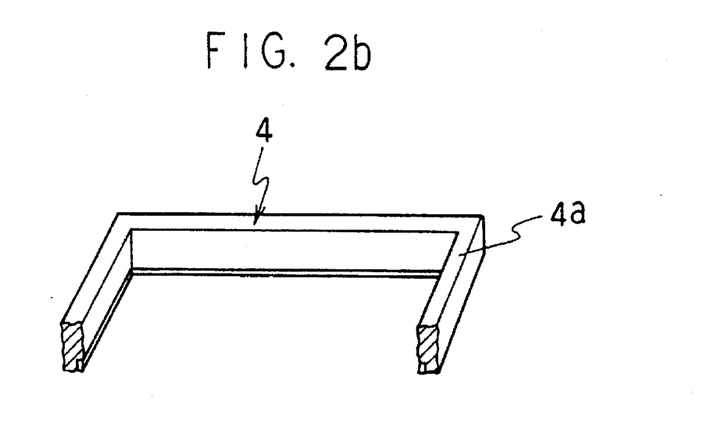

FIG. 2(a) is a plan view of a lighting unit section A of the above-mentioned device and FIG. 2(b) is a perspective view of the outer light guiding part 4a, taken along line 2b—2b of FIG. 2(a).

As shown in FIGS. 1(a) and 2(a), the outer light guiding part 4a is attached to the lamp holders 10a and 10b and, therefore, also functions as a rigid member linking the lamp holders 10a and 10b on opposite sides.

As shown in FIG. 1(a), the lower end C of a frame 1b is located outside the lateral extent W of the inner light guiding part 4b. The inner light guiding part 4b is held on its lower side (rear side) by holding members 14a and 14b mounted on the frame 1b, as shown in FIG. 1(b).

FIGS. 1(b), 3(a), 3(b), 4(a), and 4(b) show holding the inner light guiding part 4b in the frame 1b.

FIG. 1(b) illustrates an arrangement wherein the inner light guiding part 4b is fitted into the outer light guiding part 4a, and the holding members 14a and 14b, which are made of plastic or a metal plate, are inserted between the frame 1b and the light guiding board 4 on opposite lateral sides to fix the inner light guiding part 4b to the frame 1b with a screw 15.

Figure 3A:
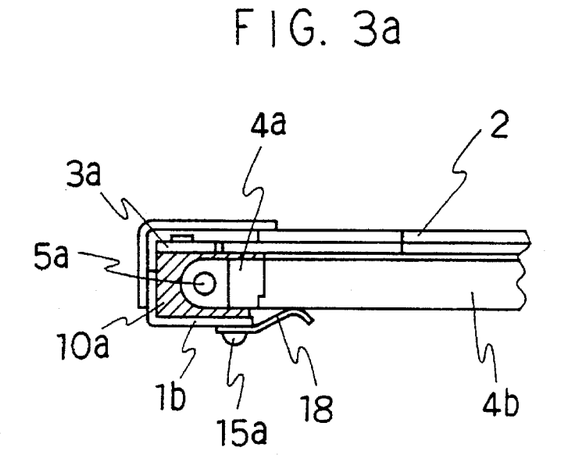
FIGS. 3(a) and 3(b) are a fragmentary sectional view and a plan view showing the structure of a holding member mounted on the inner light guiding part of the liquid crystal display device according to the first aspect of the present invention, respectively.
Figure 3B:
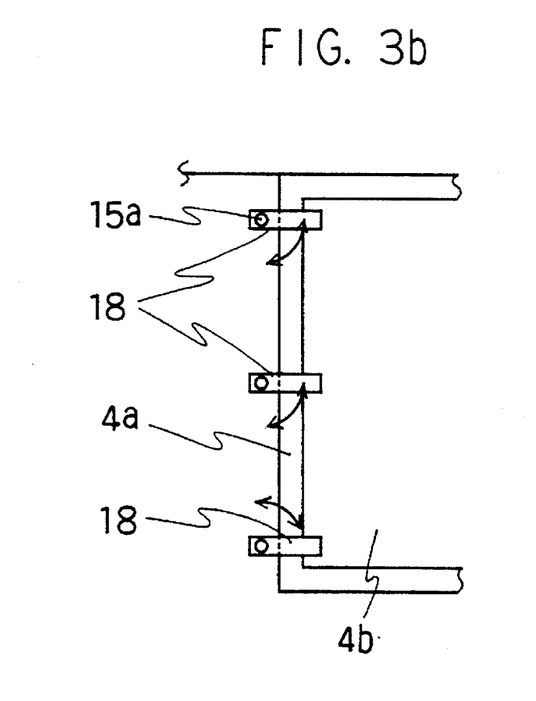

FIGS. 3(a) and 3(b) illustrate an arrangement wherein the inner light guiding part 4b is fitted into the outer light guiding part 4a and then pressed against it by means of a presser spring 18 held by a screw 15a. FIGS. 3(a) and 3(b) are a sectional view and a plan view, respectively.

Figure 4A:
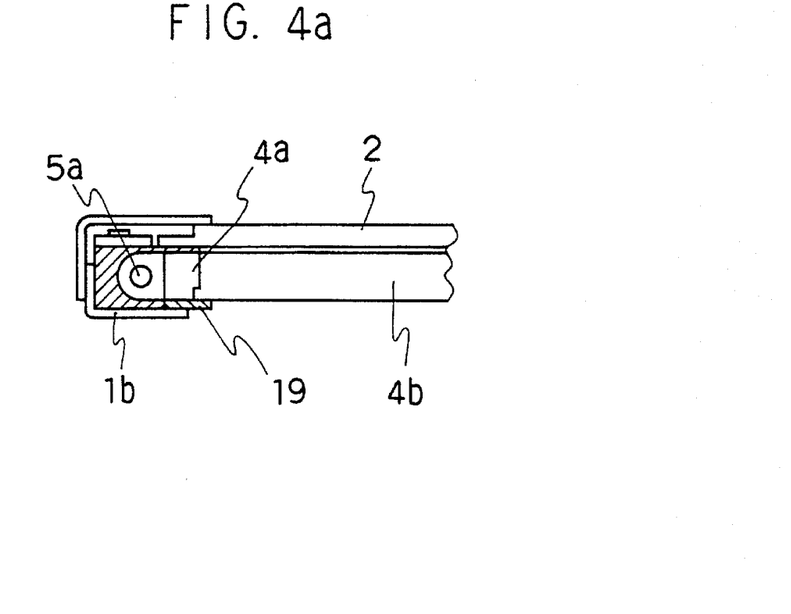
FIGS. 4(a) and 4(b) are a fragmentary sectional view and a cross-sectional view showing the structure of another example of the holding member mounted on the inner light guiding part of the liquid crystal display device according to the first aspect of the present invention, respectively.
Figure 4B:
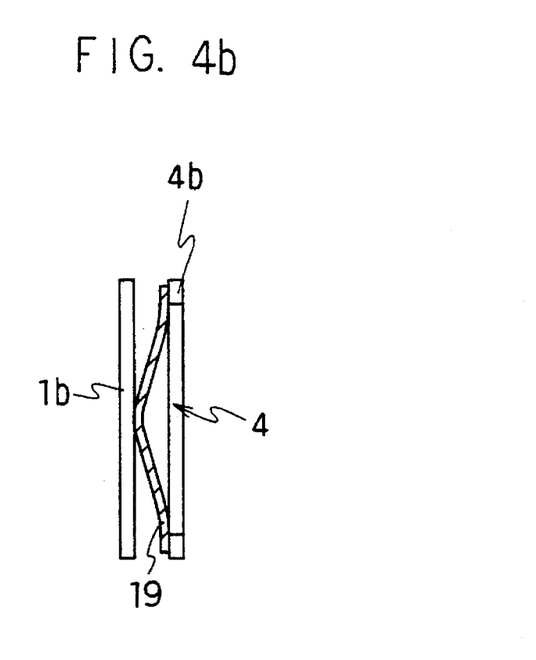

Further, FIGS. 4(a) and 4(b) illustrate an arrangement wherein the inner light guiding part 4b is fitted into the outer light guiding part 4a and another type of plate spring 19 is inserted between the frame 1b and the light guiding board 4, thereby holding the inner light guiding part 4b. FIGS. 4(a) and 4(b) are a sectional view and a fragmentary sectional view, respectively.

As in the conventional liquid crystal display device, a light diffusing plate 27 is located on the upper side (front side) of the inner light guiding part 4b so that the light of the lamp 5a passing through the light guiding part 4 is diffused and directed toward the liquid crystal display panel. Further, on the lower side of the inner light guiding part 4b are provided a light scattering processing part 12 for uniformly directing the light of the lamp 5a upward and a reflector sheet for intensely reflecting light upward only in a specified pattern.

The device of Embodiment 1 operates as follows. Of the light rays produced by the lamps 5a and 5b that pass through the outer light guiding part 4a and are incident on the inner light guiding part 4b, those upwardly reflected by the light scattering processing part 12 and the pattern of the reflector sheet 13 on the lower side of the inner light guiding part 4b are rendered uniform and applied to the liquid crystal display panel 2 by a diffusing plate 27.

Since the liquid crystal display device according to Embodiment 1 has the structure described above, it exhibits the following effects.

(1) It is possible to remove the inner light guiding part 4b without removing the frame 1b by merely removing holding members 14a and 14b mounted on the frame 1b.

(2) Since the outer light guiding part 4a serves as a rigid member connecting the lamp holders 10a and 10b, the light guiding board is supported with higher strength.

Embodiment 2

Figure 5:
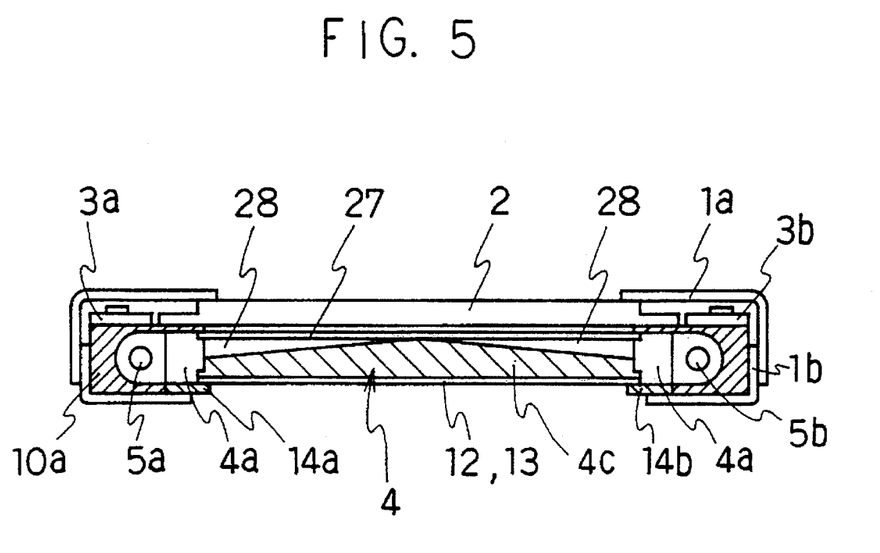
FIG. 5 is a sectional view of the structure of one embodiment of a liquid crystal display device according to the second aspect of the present invention.

FIG. 5 is a sectional view showing the structure of one embodiment of a liquid crystal display device according to the second aspect of the present invention. Since the basic structure is similar to Embodiment 1, descriptions of common parts are omitted.

In the liquid crystal display device according to Embodiment 2, an inner light guiding part 4c has a beveled shape so that the thickness increases from the opposite ends and is fitted into the outer light guiding member toward the center. The way of holding the inner light guiding part 4c within the frame 1b is the same as in Embodiment 1 and so the description is omitted.

The liquid crystal display device according to Embodiment 2 operates as follows. Of the light rays emitted from the lamps 5a and 5b, those passing through the inner light guiding part 4c and directed upward by the light scattering processing part 12 or reflector sheet 13 disposed on the lower side of the inner light guiding part 4c and those passing through a vacancy 28 and reflected upward by the inclined upper surface of the inner light guiding part 4c are added together, diffused by the diffusing plate 27, and applied to the liquid crystal display panel 2 as uniform light. The light can be rendered uniform over the entire area of the liquid crystal display panel 2 by adjusting the light scattering processing part 12 and the pattern of the reflector sheet 13, taking the distribution of incident light into consideration.

Embodiment 3

Figure 6:
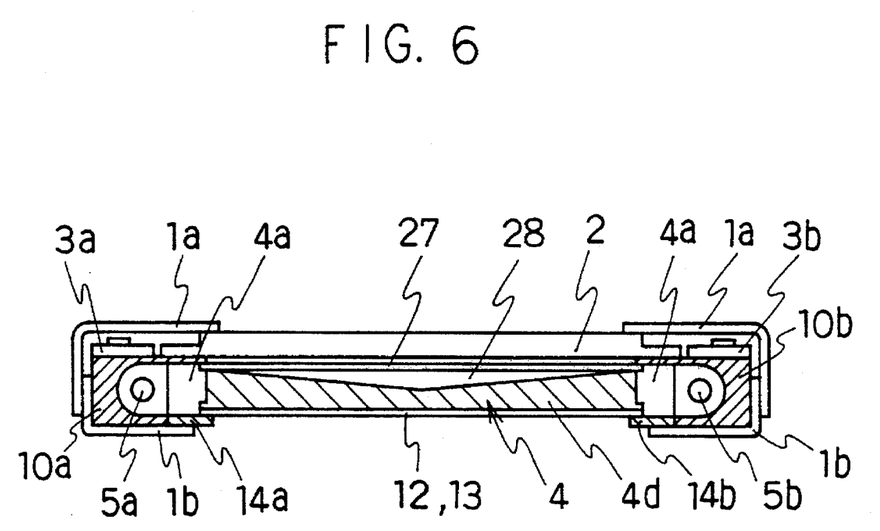
FIG. 6 is a sectional view of the structure of another embodiment of the liquid crystal display device according to the second aspect of the present invention.

FIG. 6 is a sectional view showing the structure of one embodiment of a liquid crystal display device according to the second aspect of the present invention. Since the basic structure is similar to Embodiments 1 and 2, descriptions of common parts are omitted.

In the liquid crystal display device according to Embodiment 3, an inner light guiding part 4d has a beveled shape so that the thickness decreases from the opposite ends and is fitted into the outer light guiding part 4a toward the center. The way of holding the inner light guiding part 4d within the frame 1b is the same as in Embodiment 1 and so the description is omitted.

The liquid crystal display device according to Embodiment 3 operates as follows. The major part of light from the lamps 5a and 5b is reflected downward by the inclined upper surface of the inner light guiding part 4d and then scattered or reflected upward by the light scattering processing part 12 or reflector sheet 13. The light thus directed upward is rendered uniform and applied to the liquid crystal display panel 2 by the diffusing plate 27 disposed above. The light can be rendered uniform over the entire area of the panel 2 by adjusting the light scattering processing part 12 or the pattern of the reflector sheet 13, as in Embodiment 2.

The liquid crystal display device according to Embodiment 2 or 3 employs the aforementioned structure and hence offers the following effects.

(1) It is possible to remove the inner light guiding part 4c or 4d without removing the frame 1b by merely removing the holding members 14a and 14b mounted on the frame 1b.

(2) Since the outer light guiding part 4a serves as a supporting member, the light guiding board is supported with a higher strength.

(3) The provision of the vacancy in the inner light guiding part 4c or 4d enables the device to be made light in weight.

(4) Since the major part of the light incident on the inner light guiding part 4c or 4d is directed downward to the light scattering processing part 12 and to the pattern of the reflector sheet 13, the light can be utilized with a higher efficiency.

Embodiment 4

Figure 7A:
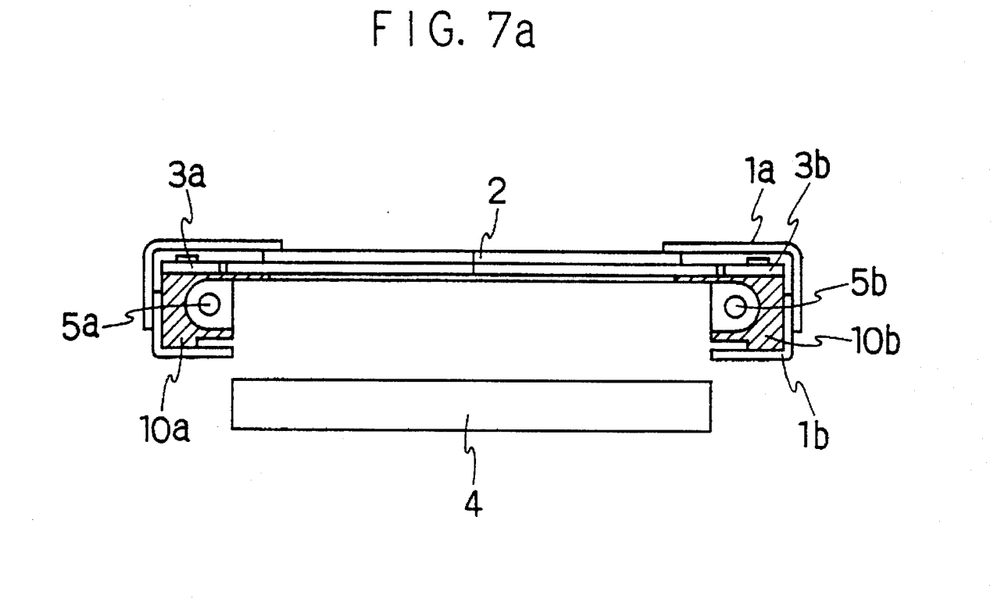
FIGS. 7(a) and 7(b) are sectional views of the structure of one embodiment of a liquid crystal display device according to the third aspect of the present invention.
Figure 7B:
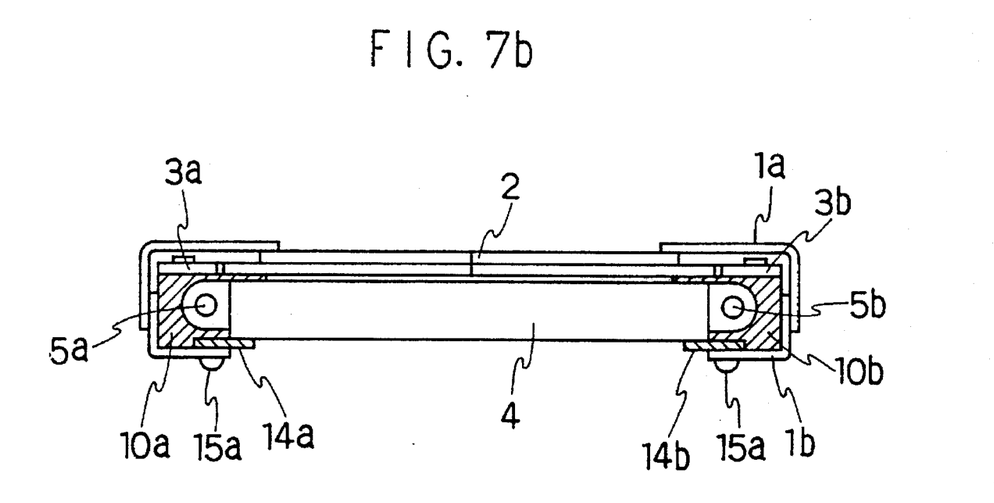

FIGS. 7(a) and 7(b) are sectional views showing the structure of one embodiment of a liquid crystal display device according to the third aspect of the present invention. Since the basic structure is similar to Embodiment 1, descriptions of common parts are omitted.

As in Embodiment 1, the liquid crystal display device according to Embodiment 4 includes a light guiding board 4 between lamps 5a and 5b held by means of holding members 14a and 14b mounted on the frame 1b, as shown in FIGS. 7(b), 3, and 4.

Figure 8A:
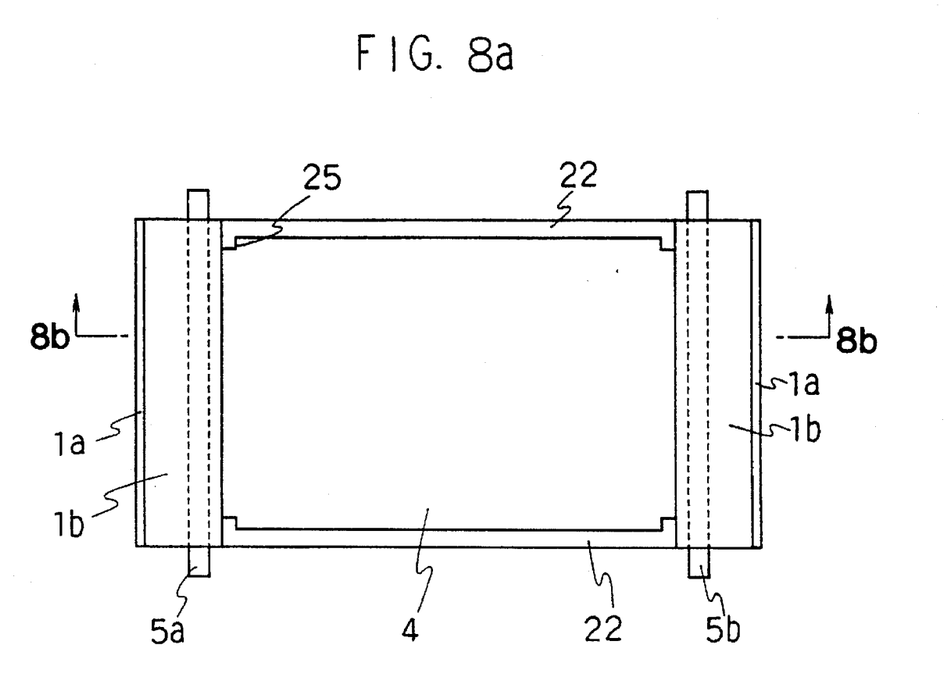
FIGS. 8(a) and 8(b) are a bottom view for illustrating holding of the light guiding board of the liquid crystal display device according to the third aspect of the present invention and a sectional view taken along 8b—8b line of FIG. 8(a), respectively.
Figure 8B:
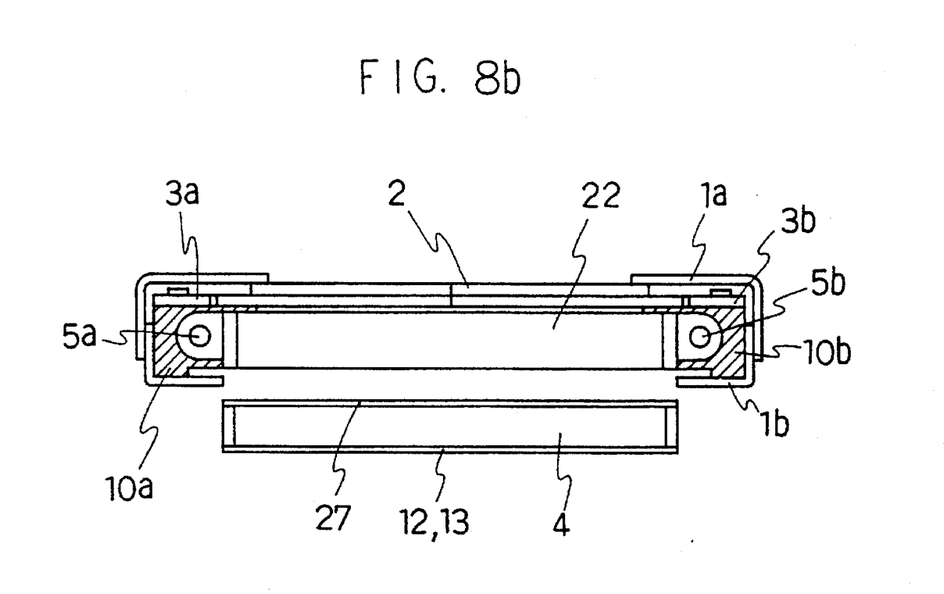

Since the device according to Embodiment 4 is less rigid than the devices according to Embodiments 1 to 3, a reinforcing frame 22 is included. FIG. 8(a) is a view of the device as viewed from below, and FIG. 8(b) is a sectional view taken along line 8b—8b of FIG. 8(a). As shown in FIG. 8(b), the reinforcing frame 22, which may be a metal or an acrylic resin, bridges across the lamp holders 10a and 10b. Numeral 25 denotes a guide along which the light guiding board 4 is fitted into the device.

The light guiding board 4 is attached to the frame from below and then held by means of the holding members 14a and 14b (not shown in FIG. 8) mounted on the frame 1 as in Embodiment 1.

The liquid crystal display device according to Embodiment 4 operates as follows. Of the light rays incident on the light guiding board 4 from the lamps 5a and 5b, those reflected upward by the light scattering processing part 12 and reflector sheet 13 on the lower side of the light guiding board 4 are rendered uniform and directed toward the liquid crystal display panel by the diffusing plate 27.

The liquid crystal display device according to Embodiment 4 exhibits the following effects.

(1) The opening under the light guiding board 4 allows the light guiding board 4 to be readily removed without detaching the frame 1b by merely removing the holding members 14a and 14b.

(2) Since the light guiding board 4 is not divided, light losses that would occur at the connecting portion of a divided light guiding board never occur so light is utilized with a higher efficiency.

(3) Since the light guiding board 4 is not divided, attachment and removal of the light guiding board 4 and diffusing plate 27 is achieved easily when the liquid crystal display device is applied to an OHP system.

Embodiment 5

Figure 9A:
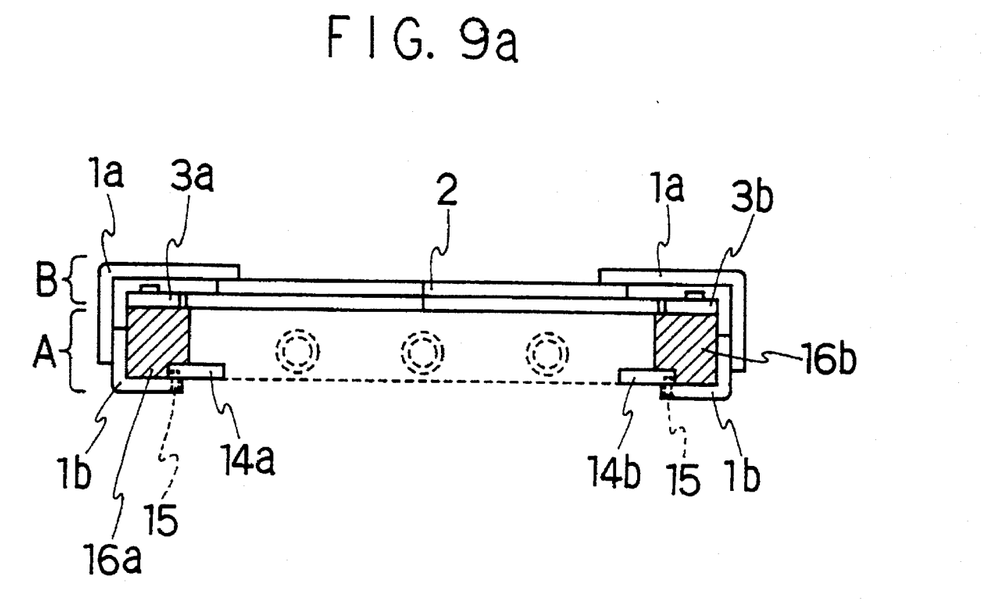
FIGS. 9(a) and 9(b) are sectional views showing the structure of a liquid crystal display device according to the fourth aspect of the present invention.
Figure 9B:
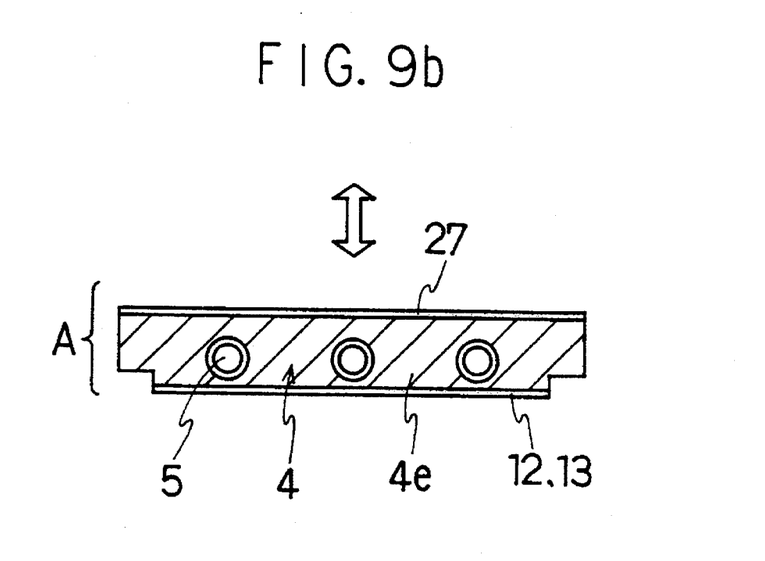

FIGS. 9(a) and 9(b) are sectional views showing the structure 10 of one embodiment of a liquid crystal display device according to the fourth aspect of the present invention. In the device shown, holding members 16a and 16b are disposed on opposite lower ends of the liquid crystal display panel 2, and fixed to the panel 2 and circuit boards 3a and 3b by means of screws or an adhesive. Each of the holding members 16a and 16b is screwed at its lateral side and bottom to a lower portion of the frame 1b and at its top and lateral side to an upper portion of the frame 1a.

A light guiding board 4e containing lamps 5 is fitted between the holding member 16a and 16b and supported on its lower side by holding members 14a and 14b mounted on lower portions of the frame 1b as in Embodiment 1.

The liquid crystal display device according to Embodiment 5 operates as follows. Light rays emitted from the lamps 5 embedded within the light guiding board 4e are added together at the surface of the light guiding board 4e, while unevenness in light intensity is evened by the light scattering processing part 12 and the pattern of the reflector sheet 13 on the lower side of the light guiding board 4e. The light rays are then rendered uniform and applied to the liquid crystal panel 2 by means of the diffusing plate 27.

The lamps are embedded within the light guiding board 4e so that the lamps are securely held and easily handled since the liquid crystal display panel 2 is evenly illuminated by the thin light guiding board 4e, thereby contributing to the construction of a thin liquid crystal display device. To enhance the above effects, there might be formed a light and shade pattern in which a carbon-powder pattern is developed in the light guiding board.

The liquid crystal display device according to Embodiment 5 employs the aforementioned structure and exhibits the following effects.

(1) The light guiding board 4e can readily be removed without detaching the frame 1b by merely removing the holding members 14a and 14b mounted on lower portions of the frame 1b.

(2) Of light rays emitted from the lamps embedded within the light guiding board 4e, those running directly upward and those reflected by the light scattering processing part 12 and the pattern of the reflector sheet 13 on the lower side of the light guiding board 4e are added together, thereby effectively utilizing omnidirectional light rays. This arrangement realizes a lighting unit section A having lower power consumption.

(3) The lighting unit section can be entirely removed from the liquid crystal display panel, thus assuring a liquid crystal display device with a smaller weight and higher manipulability.

As has been described, the liquid crystal display device according to the first aspect of the present invention has a structure wherein the inner light guiding part 4b is fitted into the outer light guiding part 4a and held by the holding members 14a and 14b from below. Such a structure allows the inner light guiding part 4b to be readily removed without detaching the frame 1b by merely removing the holding members 14a and 14b.

Further, the outer light guiding part 4a serves also as a supporting member for the lamp holders on opposite sides. Therefore, deformation of the device is less likely. In addition, the device has a simplified structure, allows the inner light guiding part 4b and diffusing plate 27 to be removed simultaneously, and offers higher manipulability.

In the liquid crystal display device according to the second aspect of the present invention the inner light guiding part 4c or 4d is held in the same manner as in the device according to the first aspect. Hence, it is possible to readily remove the inner light guiding part 4c or 4d without detaching the frame 1b by merely removing the holding members 14a and 14b.

Further, the inner light guiding part 4c or 4d has a beveled shape from the opposite ends toward the center to define the vacancy 28 so that the device is lighter.

With the liquid crystal display device according to the third aspect of the present invention, it is possible to readily remove the light guiding board 4 without detaching the frame 1b by merely removing the holding members 14a and 14b mounted on the frame 1b outside the lateral sides, adjoining the lamps, of the light guiding board 4. Further, the device has a simplified structure and has a higher manipulability.

The liquid crystal display device according to the fourth aspect of the present invention has a structure wherein the light guiding board 4e containing the lamps is held by the holding members 14a and 14b. Such a structure allows the light guiding board 4e to be readily removed without detaching the frame 1b by merely removing the holding members 14a and 14b mounted on the frame 1b.

Further, since the light source 5 is embedded within the light guiding board 4e, light is utilized efficiently with reduced power consumption. In addition, the device from which the light guiding board is removed is light weight and simple, thus offering good manipulability.

While only certain presently preferred embodiments have been described in detail, as will be apparent to those familiar with the art, changes and modifications can be made without departing from the spirit and scope of the invention as defined by the following claims.

What is claimed is:

1. A liquid crystal display device comprising:

a liquid crystal display panel;

lamps;

lamp holders holding respective lamps;

a light guiding board positioned between the lamps; and a frame supporting the lamp holders, wherein the light guiding board comprises an outer light guiding part fixed to the lamp holders, and an inner light guiding part removably fitting into and securable within the outer light guiding part with a holding member removably mounted to the frame.

2. The liquid crystal display device according to claim 1 comprising:

a diffusing plate disposed on a first side of the inner light guiding part for diffusing light passing through the inner light guiding part;

a light scattering part disposed on a second side of the inner light guiding part for directing light from the lamps toward the liquid crystal display panel; and a reflector sheet disposed on the second side of the inner light guiding part for reflecting light from the lamps toward the liquid crystal display panel in a pattern.

3. The liquid crystal display device according to claim 1 wherein the holding member comprises a leaf spring.

4. The liquid crystal display device according to claim 1 wherein the holding member comprises a plate spring.

5. A liquid crystal display device comprising:

a liquid crystal display panel;

lamps;

lamp holders holding respective lamps;

a light guiding board positioned between the lamps; and a frame supporting the lamps and the lamp holders, wherein the light guiding board comprises an outer light guiding part fixed to the lamp holders, and an inner light guiding part removably fitted into and securable within the outer light guiding part with a holding member removably mounted to the frame, the light guiding board having first and second surfaces and first and second edges, the first surface being convex or concave.

6. The liquid crystal display device according to claim 5 wherein the first surface is convex.

7. The liquid crystal display device according to claim 5 wherein the first surface is concave.

8. The liquid crystal display device according to claim 5 comprising:

a diffusing plate disposed on a first side of the inner light guiding part for diffusing light passing through the inner light guiding part;

a light scattering part disposed on a second side of the inner light guiding part for directing light from the lamps toward the liquid crystal display panel; and a reflector sheet disposed on the second side of the inner light guiding part for reflecting light from the lamps toward the liquid crystal display panel in a pattern.

9. A liquid crystal display device comprising:

a liquid crystal display panel;

lamps;

lamp holders holding respective lamps;

a light guiding board positioned between the lamps, the light guiding board having first and second edges;

a frame holding the lamp holders, wherein the frame comprises a front frame part covering a front side of the lamps and lamp holders, and a rear frame part supporting a rear side of the lamp holders and the light guiding board with a removable holding member, the rear frame part being disposed outside the first and second edges of the light guiding board and having an end edge closest to the first and second edges of the light guiding board that is outwardly spaced apart from the light guiding board; and a reinforcing frame positioned between the lamp holders.

10. The liquid crystal display device according to claim 9 comprising:

a diffusing plate disposed on a first side of the light guiding board for diffusing light passing through the light guiding board;

a light scattering part disposed on a second side of the light guiding board for directing light from the lamps toward the liquid crystal display panel; and a reflector sheet disposed on the second side of the light guiding board for reflecting light from the lamps toward the liquid crystal display panel in a pattern.

11. A liquid crystal display device comprising:

a liquid crystal display panel;

a frame holding the liquid crystal display panel;

a light guiding board positioned in the frame with a removable holding member mounted to the frame for guiding light introduced into the light guiding board;

at least one lamp disposed within the light guiding board for producing light introduced into the light guiding board;

a diffusing plate disposed on a first side of the light guiding board for diffusing light passing through the light guiding board;

a light scattering part disposed on a second side of the light guiding board for directing light from the lamp toward the liquid crystal display panel: and a reflector sheet disposed on the second side of the light guiding board for reflecting light from the lamp toward the liquid crystal display panel in a pattern.

* * * * *